United States Patent [19]
Hansen

[11] 4,106,201
[45] Aug. 15, 1978

[54] TAPE MEASURE

[76] Inventor: Owen P. Hansen, 1200 Grand Ave., #4, Spring Valley, Calif. 92077

[21] Appl. No.: 786,972

[22] Filed: Apr. 13, 1977

[51] Int. Cl.$^2$ .............................. B43L 7/00; G01B 3/10
[52] U.S. Cl. ........................................ 33/75 R; 33/138
[58] Field of Search ........................ 33/137, 138–140, 33/75, 112, 90, 173, 42

[56] References Cited

U.S. PATENT DOCUMENTS

| | | | |
|---|---|---|---|
| 889,570 | 6/1908 | Ayers | 33/138 |
| 2,571,569 | 10/1951 | Greenwood | 33/138 X |

FOREIGN PATENT DOCUMENTS

| | | | |
|---|---|---|---|
| 113,424 | 2/1918 | United Kingdom | 33/138 |

Primary Examiner—Harry N. Haroian
Attorney, Agent, or Firm—Charles C. Logan, II

[57] ABSTRACT

An improved tape measure having a casing with a retractable measure tape coiled therein, and carpenter's square blade structure secured to the casing. The carpenter's square blade structure is pivotally attached to the casing thus allowing it to be moved into and out of engagement with the side walls of the casing whereby a line may easily be scribed perpendicular to the longitudinal axis of the measuring tape by running a marking instrument along the forward edge of the carpenter's square blade structure on the surface to be scribed. The casing has recesses formed in the side walls for receiving the arms of the carpenter's square blade structure. Within these recesses, magnets have been inserted to hold the arms of the carpenter's square blade structure in a folded up position. The carpenter's square blade structure may be detachably mounted on the bottom wall of the casing.

9 Claims, 4 Drawing Figures

U.S. Patent  Aug. 15, 1978  4,106,201
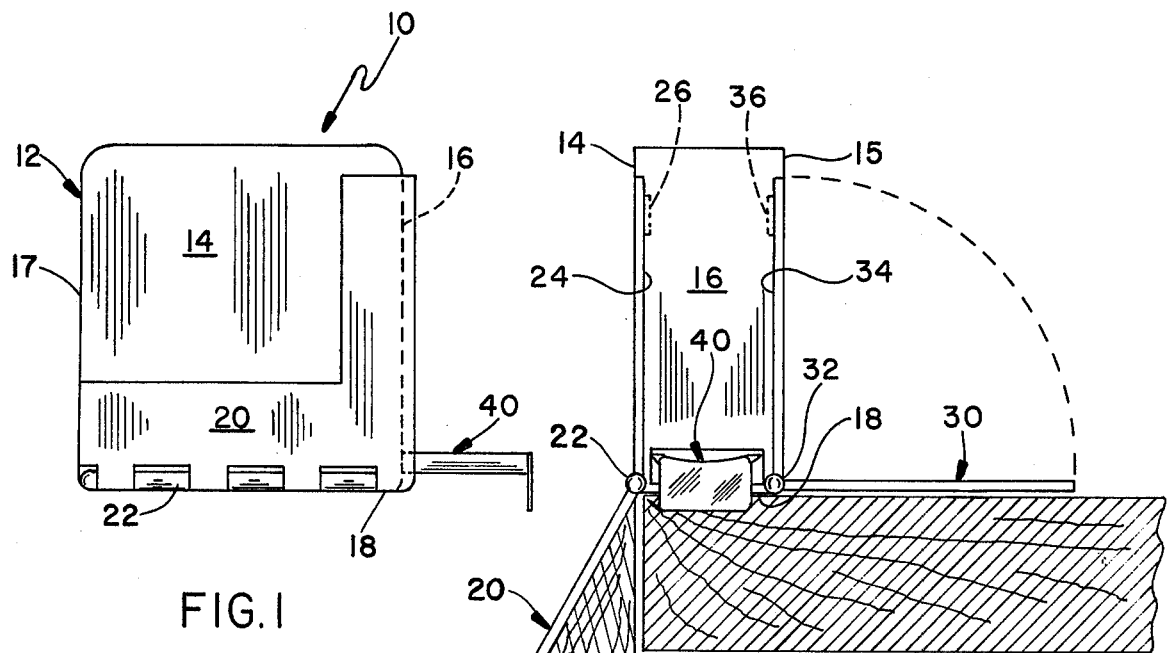
FIG.1
FIG.2
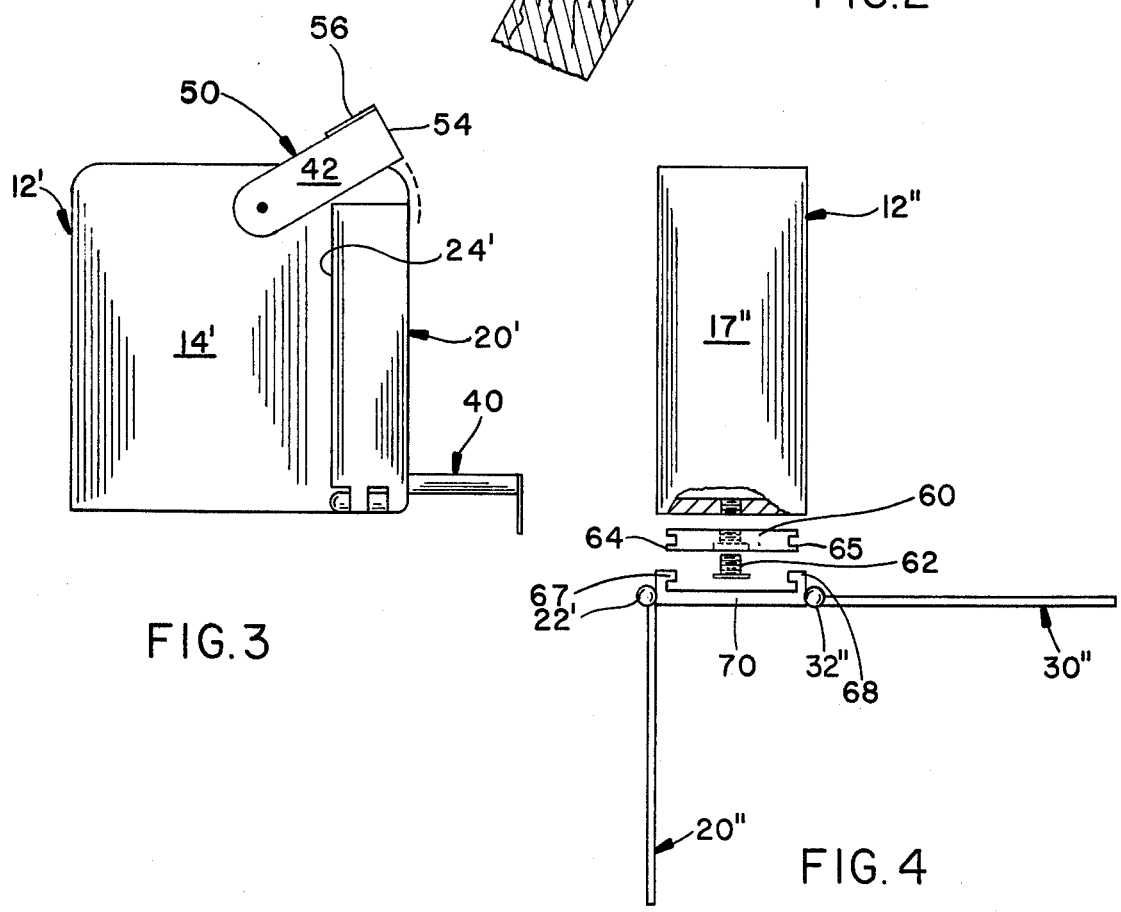
FIG.3
FIG.4

TAPE MEASURE

BACKGROUND OF THE INVENTION

The invention relates to a combined tape measure and square. In the past, such devices have been known but these utilized a rigid carpenter's square to which a tape measure casing was secured much in the manner of U.S. Pat. No. 530,111 and U.S. Pat. No. 1,323,742. In both of these devices, the arm of the square along which a line perpendicular to the casing may be scribed, is hold in fixed, angular alignment with the longitudinal axis of the tape measure casing. These devices were only designed to work where the surfaces contacted by the tape measure casing and the arm of the square were at 90° to each other. Where the two surfaces to be measured and marked met each other, at an angle other than 90°, either larger than or less than, it was impossible to keep both the bottom surface of the tape measure casing and the arm of the square in flush contact with the surfaces to be scribed.

It is the object of the invention to provide a new and improved tape measured that will allow for squaring and measuring in one operation along two surfaces that meet each other at an angle either greater than 90° or at an angle less than 90°.

It is also an object of the invention to provide a new and improved tape measure that is economical to manufacture.

It is a further object of the invention to provide a new and improved tape measure that can be produced by attaching, pivotally mounted square blades to an already existing tape measure casing.

SUMMARY OF THE INVENTION

The improved tape measure has a casing with a retractable measuring tape coiled therein. A carpenter's square blade structure is pivotally secured to the casing. This carpenter's square blade structure allows the flat bottom wall surface of the casing to be held against a flat surface to be measured, while the arms of the carpenter's square blade structure may be pivoted to make an angle either greater than 90° or less than 90° with respect to the flat surface on which the bottom wall of the casing is resting.

The carpenter's square blade structure may be formed from an L-shaped member or from a straight arm member that is pivotally attached to the tape measure casing. There may be carpenter's square blade structure pivotally mounted on one or both lateral sides of the bottom wall of the casing. The manner of keeping the carpenter's square blade structure folded against the two side walls of the casing may be by a hinged cover structure or by the use of magnets inset into the two side walls. The two side walls of the casing may also have recesses formed therein on their outer surfaces to receive the carpenter's square blade structure in its folded position.

The advantages of the improved tape measure can be adapted to a standard tape measure casing by attaching an adaptor plate to the bottom wall of the standard casing and attaching an alternative carpenter's square blade structure to the adaptor.

DESCRIPTION OF THE DRAWINGS

FIG. 1 is a side elevational view of the improved tape measure illustrating the carpenter's square blade arm folded in its vertical stored position;

FIG. 2 is a front elevational view of the improved tape measure illustrating how the arms of the carpenter's square blades can be rested upon different surfaces for the purpose of drawing lines square thereto;

FIG. 3 illustrates an alternative embodiment of the tape measure having a different structure for securing the carpenter's square blade arms in the folded up position; and FIG. 4 is a rear elevational view of an alternative embodiment that illustrates how a standard tape measure can be adapted with pivotally mounted carpenter's square blade structure.

DESCRIPTION OF THE PREFERRED EMBODIMENT

Referring now to FIGS. 1 and 2, the improved tape measure, generally designed numeral 10, will be described. The improved tape measure has a casing 12 with side walls 14 and 15, front wall 16, rear wall 17 and bottom wall 18. Carpenter's square blade structure 20 and 30 are pivotally attached to bottom wall 18 by piano hinges 22 and 32, respectively. The side walls of the casings 14 and 15 having recesses 24 and 34 into which the L-shaped carpenter's square blades 20 and 30, respectively, are received with their arms folded up. Magnets 26 and 36 are inset into said recesses to hold said carpenter's square blades in retracted position when not in use. The measuring tape 40 is illustrated with its free ends extending out from a slot in the bottom of front wall 16. Bottom wall 18 extends forwardly of front wall 16 a short distance to aid in scribing lines perpendicular to the measuring tape. In this manner the markings on the tape are fully visible at the point where the perpendicular lines are to be drawn.

An alternative structure for holding the carpenter's square blade structure in the folded up position is illustrated in FIG. 3. Here a hinge cover structure 50 is pivotally attached to the side wall 14' and 15'. The hinged cover has a pair of lateral spaced arms 42 connected at their free end by a cross member 54, and has a top plate 56 that limits the downward pivotal movement of the hinge cover when it comes in contact with the top of the casing. The carpenter's square blade structure 20' in this embodiment is in the form of straight, elongated arm member. The carpenter's square blade structure 20' would set into recess 24' formed in the side wall of the casing.

The last embodiment that is illustrated in FIG. 4 shows how a standard tape measure casing 12" can be turned into an improved tape measure by securing adaptor 60 to the bottom wall of the tape measure casing by screws 62. The adaptor has longitudinally extending flanges 64 and 65 that matingly interlock with flanges 67 and 68 of member 70. The carpenter's square blades 20" and 30" are pivotally attached to member 70 by hinges 22" and 32", respectively. Either a hinged cover, as illustrated in FIG. 3, or magnets attached to the side walls of casing 12" could be utilized to maintain the carpenter's square blade members in the folded up position.

Having thus described the invention, what is desired to be United States Letters Patent is:

1. An improved tape measure comprising:
   a casing having a retractable measuring tape coiled therein;
   said casing comprising a front wall, two side walls, and a bottom wall;

carpenter's square blade means pivotally secured to said casing at the intersection of said bottom wall and one of said side walls, the axis about which said blade means pivot extending substantially along the length of the edge of the casing that is formed by the intersection of said bottom wall and one of said side walls;

said carpenter's square blade means being pivotally moveable into and out of engagement with at least one of said side walls whereby a line can easily be scribed perpendicular to the longitudinal axis of said measuring tape by running a marking instrument along the forward edge of said carpenter's square blade means on the surface to be scribed.

2. An improved tape measure as recited in claim 1 wherein said carpenter's square blade means is pivotally secured to said casing by hinges.

3. An improved tape measure as recited in claim 1 wherein said carpenter's square blade means has at least one arm.

4. An improved tape measure as recited in claim 1 wherein said casing has a recess in at least one of said side walls for receiving an arm of said carpenter's square blade means.

5. An improved tape measure as recited in claim 3 wherein at least one of said side walls has a magnet to hold an arm of said carpenter's square blade means in the folded up position.

6. An improved tape measure as recited in claim 3 further comprising hinged cover means for holding an arm of said carpenter's square blade means in the folded up position.

7. An improved tape measure as recited in claim 6 wherein said hinged cover means comprises a pair of arms, a cross member, and a top plate.

8. An improved tape measure as recited in claim 3 wherein said arm is L-shaped.

9. An improved tape measure as recited in claim 1 wherein said carpenter's square blade means is detachably mounted on said bottom wall.

* * * * *